(12) United States Patent
Chaya

(10) Patent No.: US 12,030,351 B2
(45) Date of Patent: Jul. 9, 2024

(54) PNEUMATIC TIRE

(71) Applicant: The Yokohama Rubber Co., LTD., Tokyo (JP)

(72) Inventor: Takamitsu Chaya, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 17/995,240

(22) PCT Filed: Apr. 2, 2021

(86) PCT No.: PCT/JP2021/014309
§ 371 (c)(1),
(2) Date: Sep. 30, 2022

(87) PCT Pub. No.: WO2021/206016
PCT Pub. Date: Oct. 14, 2021

(65) Prior Publication Data
US 2023/0118208 A1    Apr. 20, 2023

(30) Foreign Application Priority Data
Apr. 7, 2020 (JP) ................................ 2020-068913

(51) Int. Cl.
*B60C 9/04* (2006.01)
*B60C 9/00* (2006.01)
*D02G 3/48* (2006.01)

(52) U.S. Cl.
CPC ............ *B60C 9/0042* (2013.01); *D02G 3/48* (2013.01); *B60C 2009/0085* (2013.01);
(Continued)

(58) Field of Classification Search
CPC .............. B60C 9/04; B60C 2009/0466; B60C 2009/0458; B60C 2009/045
See application file for complete search history.

(56) References Cited

U.S. PATENT DOCUMENTS

| | | | | |
|---|---|---|---|---|
| 4,715,418 A | * | 12/1987 | Miyoshi | .................... B60C 9/04 |
| | | | | 57/902 |
| 2002/0017351 A1 | * | 2/2002 | Miyazaki | .................. B60C 9/22 |
| | | | | 152/450 |

(Continued)

FOREIGN PATENT DOCUMENTS

| | | | | |
|---|---|---|---|---|
| EP | 3287299 A1 | * | 2/2018 | ........... B60C 9/0042 |
| JP | 1058912 A | * | 1/2004 | |

(Continued)

*Primary Examiner* — Cedrick S Williams
(74) *Attorney, Agent, or Firm* — Thorpe North & Western

(57) ABSTRACT

In a pneumatic tire including a carcass layer mounted between a pair of bead portions and a belt reinforcing layer disposed on an outer circumferential side of the carcass layer, the carcass layer is formed of a carcass cord made of an organic fiber cord, an elongation at break of the carcass cord is set to 20% or more, an elongation under a load of 1.5 cN/dtex of the carcass cord on the inner circumferential side of the belt layers is set to from 5.5% to 8.5%, the belt reinforcing layer is formed of a cover cord made of an organic fiber cord, and a tensile strength of the cover cord per width of 50 mm at a 3.0% elongation is set to from 2.8 kN to 4.0 kN.

8 Claims, 1 Drawing Sheet

(52) U.S. Cl.
CPC ................ *B60C 2009/0092* (2013.01); *D10B 2331/021* (2013.01); *D10B 2331/04* (2013.01); *D10B 2401/063* (2013.01)

(56) References Cited

U.S. PATENT DOCUMENTS

2007/0116951 A1\* 5/2007 Kwon ...................... D01F 6/62
428/375
2009/0301627 A1\* 12/2009 Manno ................. B60C 9/2006
152/527
2020/0070579 A1\* 3/2020 Tahon ...................... C08L 7/00

FOREIGN PATENT DOCUMENTS

| | | | |
|---|---|---|---|
| JP | 2004-306633 | A | 11/2004 |
| JP | 2006-137315 | A | 6/2006 |
| JP | 2010-23834 | A | 2/2010 |
| JP | 2010-149831 | A | 7/2010 |
| JP | 2014-65438 | A | 4/2014 |
| JP | 2015231773 | A \* | 12/2015 |
| JP | 2019-156070 | A | 9/2019 |
| JP | 2020-147166 | A | 9/2020 |
| WO | 2016/143757 | A1 | 9/2016 |
| WO | 2020/241237 | A1 | 12/2020 |
| WO | 2021/039792 | A1 | 3/2021 |

\* cited by examiner

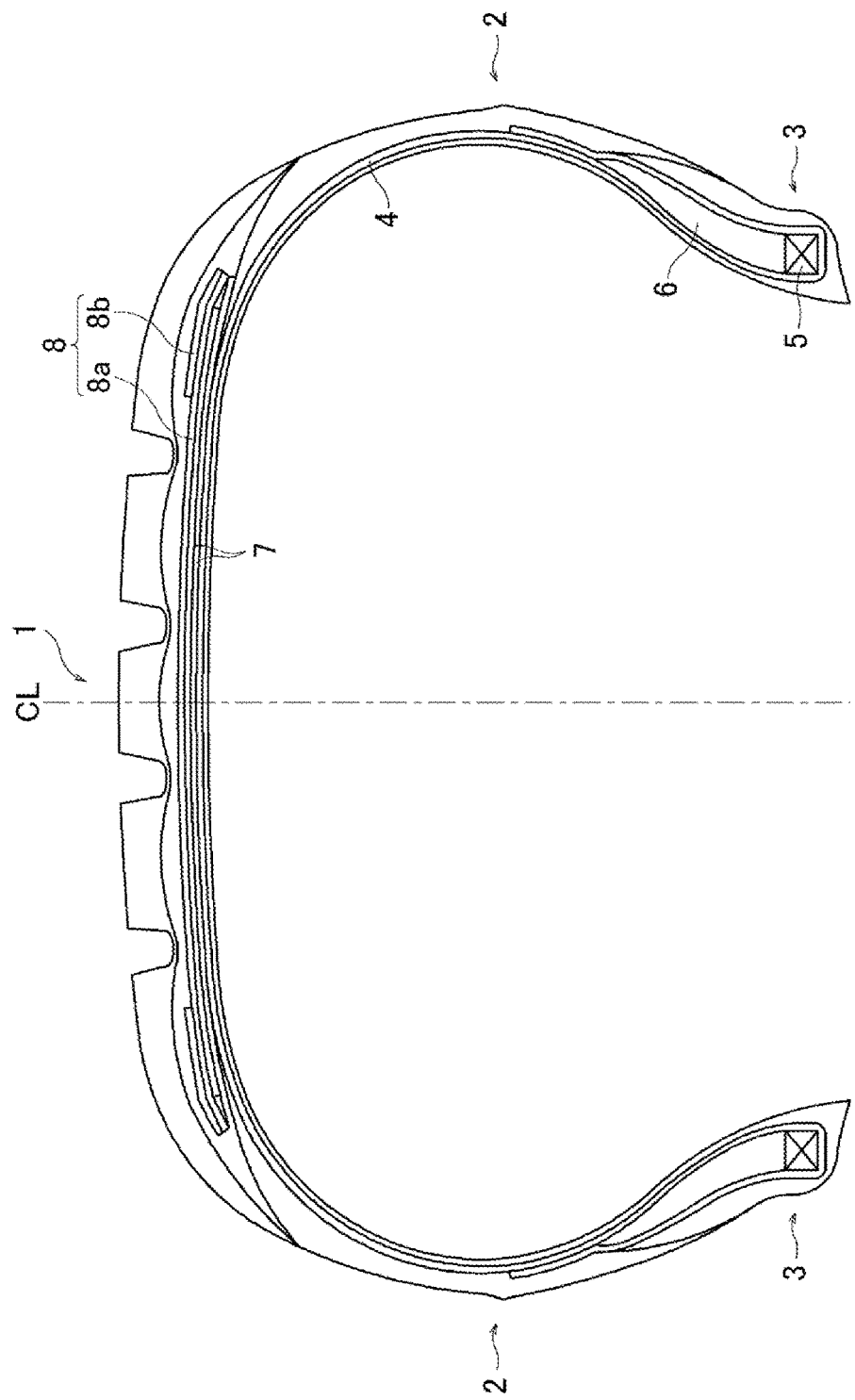

PNEUMATIC TIRE

TECHNICAL FIELD

The present technology relates to a pneumatic tire including a belt reinforcing layer formed of an organic fiber cord having a high elasticity.

BACKGROUND ART

A typical pneumatic tire intended to be used for high-speed driving provides a belt reinforcing layer formed of a reinforcing cord oriented in a tire circumferential direction on a further outer circumferential side of a belt layer disposed on an outer circumferential side of a carcass layer in a tread portion (for example, see Japan Unexamined Patent PublicationNo. 2010-149831 A). The belt reinforcing layer mainly prevents a separation failure due to rising of both end portions of the belt layer caused by a centrifugal force at high speeds and improves high-speed durability.

To further improve the high-speed durability based on such a belt reinforcing layer, using an organic fiber cord having a high rigidity for a reinforcing cord constituting the belt reinforcing layer has recently been examined. Unfortunately, using the belt reinforcing layer formed of the organic fiber cord having high rigidity (hereinafter referred to as a high rigidity cover) increases a bending rigidity of a tread portion. This decreases a ground contact area and may degrade steering stability. This requires measures to improve the high-speed durability without impairing the steering stability even when the high rigidity cover is used.

SUMMARY

The present technology provides a pneumatic tire that can provide improved high-speed durability and satisfactorily-maintained steering stability in a highly compatible manner.

A pneumatic tire according to an embodiment of the present technology includes a tread portion extending in a tire circumferential direction and having an annular shape, a pair of sidewall portions respectively disposed on both sides of the tread portion, a pair of bead portions each disposed on an inner side of the sidewall portions in a tire radial direction, at least one carcass layer mounted between the pair of bead portions, a plurality of belt layers disposed on an outer circumferential side of the carcass layer in the tread portion, and a belt reinforcing layer disposed on an outer circumferential side of the belt layers. In the pneumatic tire, the carcass layer is formed of a carcass cord made of an organic fiber cord, an elongation at break of the carcass cord is 20% or more, an elongation under a load of 1.5 cN/dtex of the carcass cord on an inner circumferential side of the belt layers is from 5.5% to 8.5%, the belt reinforcing layer is formed of a cover cord made of an organic fiber cord, and a tensile strength of the cover cord per width of 50 mm at a 3.0% elongation is from 2.8 kN to 4.0 kN.

According to an embodiment of the present technology, the tensile strength of the organic fiber cord (cover cord) constituting the belt reinforcing layer per width of 50 mm at a 3.0% elongation ranges from 2.8 kN to 4.0 kN, and the rigidity of the belt reinforcing layer is moderately high, allowing rising of belt end portions during high-speed travel to be effectively suppressed and the high-speed durability to be improved. On the other hand, the elongation under a load of 1.5 cN/dtex of the organic fiber cord (carcass cord) constituting the carcass layer on the inner circumferential side of the belt layers is set to from 5.5% to 8.5%, causing the rigidity of the carcass layer to be moderately low in a region overlapping the belt layers. This can ensure a sufficient ground contact area and improve steering stability. These improvements in cooperation allows the pneumatic tire according to an embodiment of the present technology to provide improved high-speed durability and satisfactorily-maintained steering stability in a highly compatible manner. In addition to the above, the elongation at break of the carcass cord is 20% or more, thus deformation of the carcass cord during a plunger energy test (when pressed by a plunger) can be sufficiently allowed, and a failure energy (failure durability of the tread portion against a projection input) can be improved. That is, an effect of improving shock burst resistance of the pneumatic tire (durability against damage causing carcass failure, or shock burst, due to a large shock applied to the tire during travel) can also be added.

According to an embodiment of the present technology, a thermal shrinkage rate of the carcass cord preferably ranges from 0.5% to 2.5%. This may reduce the durability due to the occurrence of kinking (such as twisting, folding, wrinkling, and collapsing in shape) of the carcass cord during vulcanization and prevent the degradation in uniformity.

According to an embodiment of the present technology, a twist coefficient K of the carcass cord represented by Formula (1) below preferably ranges from 2000 to 2500. This achieves good cord fatigue and can ensure excellent durability.

$$K = T \times D^{1/2} \tag{1}$$

(where T is a cable twist count (times/10 cm) of the carcass cord and D is a total fineness (dtex) of the carcass cord.)

According to an embodiment of the present technology, the carcass cord preferably includes polyethylene terephthalate fibers. By using polyethylene terephthalate fibers (PET fibers) as just described, high-speed durability and steering stability are advantageously provided by the excellent physical properties of the fibers in a well-balanced and highly compatible manner. Furthermore, cost reduction and workability can be improved.

According to an embodiment of the present technology, the cover cord preferably includes aromatic polyamide fibers. By using aromatic polyamide fibers as just described, high-speed durability and steering stability are advantageously provided by the excellent physical properties of the fibers in a well-balanced and highly compatible manner. In particular, it is advantageous to increase the rigidity of the cover cord and improve the durability of the cover cord.

BRIEF DESCRIPTION OF DRAWINGS

The Drawing is a meridian cross-sectional view illustrating a pneumatic tire according to an embodiment of the present technology.

DETAILED DESCRIPTION

A configuration according to an embodiment of the present technology will be described in detail below with reference to the accompanying drawings.

As illustrated in the Drawing, a pneumatic tire of an embodiment of the present technology includes a tread portion 1, a pair of sidewall portions 2 disposed on both sides of the tread portion 1, and a pair of bead portions 3 disposed in the sidewall portions 2 on the inner side in the tire radial direction.

Note that "CL" in the Drawing denotes a tire equator. Although not illustrated in the Drawing, which is a meridian cross-sectional view, the tread portion 1, the sidewall portions 2, and the bead portions 3 each extend in a tire circumferential direction to form an annular shape. This forms a toroidal basic structure of the pneumatic tire. Although the description using the Drawing is basically based on the illustrated meridian cross-sectional shape, all of the tire components each extend in the tire circumferential direction and form the annular shape.

A carcass layer 4 including a plurality of reinforcing cords (carcass cords described below) extending in the tire radial direction are mounted between the pair of left and right bead portions 3. A bead core 5 is embedded within each of the bead portions, and a bead filler 6 having an approximately triangular cross-sectional shape is disposed on an outer periphery of the bead core 5. The carcass layer 4 is folded back around the bead core 5 from an inner side to an outer side in the tire width direction. Accordingly, the bead core 5 and the bead filler 6 are wrapped by a body portion (a portion extending from the tread portion 1 through each of the sidewall portions 2 to each of the bead portions 3) and a folded back portion (a portion folded back around the bead core 5 of each bead portion 3 to extend toward each sidewall portion 2) of the carcass layer 4.

A plurality (in the illustrated example, two layers) of belt layers 7 are embedded on an outer circumferential side of the carcass layer 4 in the tread portion 1. Each of the belt layers 7 includes a plurality of reinforcing cords (belt cords) inclining with respect to the tire circumferential direction, with the belt cords of the layers intersecting each other. In the belt layers 7, an inclination angle of the belt cord with respect to the tire circumferential direction is set within a range of, for example, from 10° to 40°. For example, steel cords are preferably used as the belt cords.

To improve the high-speed durability, a belt reinforcing layer 8 is further provided on an outer circumferential side of the belt layers 7. The belt reinforcing layer 8 includes a reinforcing cord (cover cord) oriented in the tire circumferential direction. In the belt reinforcing layer 8, the angle of the cover cord with respect to the tire circumferential direction is set to, for example, from 0° to 5°. As the belt reinforcing layer 8, a full cover layer 8a that covers the entire region of the belt layers 7 in the width direction, a pair of edge cover layers 8b that locally cover both end portions of the belt layers 7 in the tire width direction, or a combination thereof can be provided (in the example illustrated, both of the full cover layer 8a and the edge cover layers 8b are provided). The belt reinforcing layer 8 can be formed, for example, by helically winding a strip material made of at least a single cover cord bunched and covered with coating rubber in the tire circumferential direction.

According to an embodiment of the present technology, the cover cord constituting the belt reinforcing layer 8 is formed of an organic fiber cord obtained by intertwining organic fiber filament bundles. The tensile strength of the cover cord (organic fiber cord) per width of 50 mm at a 3.0% elongation ranges from 2.8 kN to 4.0 kN and preferably from 3.1 kN to 3.7 kN. Using the cover cord having the above-described physical properties can moderately increase the rigidity of the belt reinforcing layer 8, effectively suppress the rising of the belt end portions during high-speed travel, and improve the high-speed durability. When the tensile strength of the cover cord per width of 50 mm at a 3.0% elongation is less than 2.8 kN, the rising of the belt end portions during high-speed travel cannot be sufficiently suppressed, and the effect of improving the high-speed durability is limited. When the tensile strength of the cover cord per width of 50 mm at a 3.0% elongation exceeds 4.0 kN, the rigidity of the tread portion 1 is excessively increased, the ground contact area is decreased, and thus the steering stability is degraded. Note that "tensile strength per width of 50 mm at a 3.0% elongation" is a value obtained by sampling a cord (sample cord) from the tire, performing a tensile test immediately after the sampling under conditions of an initial load of 0.45 mN/dtex, a distance between grips of 250 mm, and a tensile speed of 300±20 mm/min, and multiplying a strength measured when the sample cord is elongated by 3.0% by the number of cords included in the tire per width of 50 mm.

The type of organic fibers constituting the cover cord (organic fiber cord) is not limited as long as the above-described physical properties are satisfied. For example, polyester fibers, nylon fibers, or aromatic polyamide fibers (aramid fibers) can be used. Preferably, aramid fibers are included, and in particular, a hybrid cord formed of nylon fibers and aramid fibers can be suitably used. When aromatic poly amide fibers are included (when a hybrid cord formed of nylon fibers and aramid fibers is used), the excellent physical properties (high rigidity) of the fibers can effectively improve the high-speed durability.

In improving the high-speed durability as described above using the belt reinforcing layer 8 formed of the cover cord having high rigidity, an embodiment of the present technology uses a specific organic fiber cord to be described later for the carcass cord constituting the carcass layer 4 to prevent degradation of the steering stability due to the belt reinforcing layer 8. Therefore, the basic structure of the entire tire is not limited to those described above except for the belt reinforcing layer 8 (cover cord) described above.

According to an embodiment of the present technology, the carcass cord constituting the carcass layer 4 are formed of organic fiber cords obtained by intertwining organic fiber filament bundles. The elongation at break of the carcass cord (organic fiber cord) ranges from 20% or more and preferably from 24% to 28%. The elongation under a load of 1.5 cN/dtex of the carcass cord (organic fiber cord) on an inner circumferential side of the belt layers 7 ranges from 5.5% to 8.5% and preferably from 6.0% to 7.0%. Note that each of "the elongation at break" and "the elongation under a load of 1.5 cN/dtex" refers to an elongation ratio (%) of a sample cord that is measured under the conditions of a distance between grips of 250 mm and a tensile speed of 300±20 mm/min in accordance with JIS (Japanese Industrial Standard) L1017 "Test methods for chemical fibre tire cords". "The elongation at break" is a value measured when a cord is broken, and "the elongation under a load of 1.5 cN/dtex" is a value measured when a load of 1.5 cN/dtex is applied.

An embodiment of the present technology, which uses the carcass cord (organic fiber cord) having the above-described physical properties as the carcass layer 4, prevents degradation of steering stability due to a cover cord having high rigidity to be used for the belt reinforcing layer 8 as described above and can satisfactorily maintain the steering stability. That is, the carcass cord has the above-described physical properties (elongation under a load of 1.5 cN/dtex) on the inner circumferential side of the belt layers 7, the rigidity in a region overlapping the belt layers 7 is moderately low. This can ensure a sufficient ground contact area, enabling satisfactory steering stability. Further, the elongation at break of the carcass cord is set to the range described above, and the shock burst resistance can also be improved. That is, the shock burst resistance can be determined by, for example, a plunger energy test (a test to measure a failure energy at the time of tire breakage by pushing a plunger having a predetermined size against the central portion of the tread), using the cord having the above-described elongation at break allows deformation during the test (when pressed by the plunger), and thus favorable results can be obtained in the plunger energy test. In other words, applied to during travel, the failure durability (corresponding to the failure energy described above) of the tread portion 1 against a projection input can be increased, and the shock burst resistance of the pneumatic tire can be improved.

When the elongation under a load of 1.5 cN/dtex of the carcass cord on the inner circumferential side of the belt layers 7 is less than 5.5%, the rigidity of the carcass layer 4 in the region overlapping with the belt layers 7 is increased, the compression strain of the turned up end portions of the carcass layer 4 immediately under a ground contact region is increased, and the cord may be broken (that is, the durability may be impaired). When the elongation under a load of 1.5 cN/dtex of the carcass cord on the inner circumferential side of the belt layers 7 exceeds 8.5%, the above-described effect of ensuring the ground contact area cannot be sufficiently achieved, and the effect of improving the steering stability is limited. When the elongation at break of the carcass cord is less than 20%, favorable results cannot be obtained in the plunger energy test. In other words, the failure energy (failure durability of the tread portion against a projection input) when the pneumatic tire rides over protrusions on uneven road surfaces cannot be increased, and the effect of improving the shock burst resistance of the pneumatic tire cannot be sufficiently expected.

Furthermore, the carcass cord (organic fiber cord) preferably has a thermal shrinkage rate of 0.5% to 2.5%, and more preferably 1.0% to 2.0%. Note that "thermal shrinkage rate" is a dry thermal shrinkage rate (%) of sample cords measured in accordance with JIS L1017 "Test methods for chemical fiber tire cords" with a length of specimen being 500 mm and when heated at 150° C. for 30 minutes. By using cords having such a thermal shrinkage rate, the reduction in the durability or the deterioration in the uniformity due to the occurrence of kinking (twisting, folding, wrinkling, collapsing in shape, and the like) in the organic fiber cords during vulcanization can be suppressed. In this case, when the thermal shrinkage rate of the carcass cord is less than 0.5%, kinking tends to occur during vulcanization, and thus it is difficult to favorably maintain durability. When the thermal shrinkage rate of the carcass cord exceeds 2.5%, uniformity may deteriorate.

In addition, the carcass cord is configured such that a twist coefficient K represented by Formula (1) described below is preferably 2000 to 2500 and is more preferably 2100 to 2400. Note that the twist coefficient K is a value of the carcass cord after dip treatment. Using a cord having such a twist coefficient K achieves good cord fatigue and can ensure excellent durability. In this case, when the twist coefficient K of the carcass cord is less than 2000, the cord fatigue deteriorates, and thus it is difficult to ensure durability. When the twist coefficient K of the carcass cord exceeds 2500, productivity of the carcass cord deteriorates.

$$K = T \times D^{1/2} \tag{1}$$

(where T is a cable twist count (times/10 cm) of the carcass cord and D is a total fineness (dtex) of the carcass cord.)

The type of organic fibers constituting the carcass cord (organic fiber cord) is not limited. For example, polyester fibers, nylon fibers, or aromatic polyamide fibers (aramid fibers) can be used, and, in particular, polyester fibers can be suitably used. Additionally, examples of the polyester fibers include polyethylene terephthalate fibers (PET fibers), polyethylene naphthalate fibers (PEN fibers), polybutylene terephthalate fibers (PBT), and polybutylene naphthalate fibers (PBN), with PET fibers being particularly suitable. Whichever fiber is used, the physical properties of the fiber advantageously provide the high-speed durability and the steering stability in a well-balanced and highly compatible manner. In particular, in the case of PET fibers, the PET fibers are inexpensive, enabling cost reduction of the pneumatic tire. In addition, workability in producing cords can be increased.

EXAMPLES

Pneumatic tires of Conventional Example 1, Comparative Examples 1 to 6, and Examples 1 to 6 having a tire size of 275/40ZR20 and a basic structure illustrated in the Drawing were manufactured. The material (type of an organic fiber) and the physical properties (an elongation at break, an elongation under a load of 1.5 cN/dtex on the inner circumferential side of the belt layers, a thermal shrinkage rate, and a twist coefficient K) of the carcass cord constituting the carcass layer, and the material (type of an organic fiber) and the physical properties (a tensile strength per width of 50 mm at a 3.0% elongation) of the cover cord constituting the belt reinforcing layer are differentiated as shown in Tables 1 and 2.

In the field of "Type of organic fiber" in Tables 1 and 2, "PET" is indicated when a polyethylene fiber cord (PET fiber cord) is used, and "Nylon+Aramid" is indicated when a hybrid cord formed of a nylon fiber and an aramid fiber is used. The PET fiber cord has a structure of 2200 dtex/2, and the hybrid cord formed of nylon fibers and aramid fibers has a structure of aramid 1670 dtex (two) and nylon 1400 dtex (one)/3. In these examples, the belt reinforcing layer has a jointless structure in which a strip formed by covering a cover cord (any of the above-described organic fiber cords) with coating rubber is helically wound in the tire circumferential direction. The cord density in the strip is 40 cords/50 mm.

These test tires were evaluated for the high-speed durability, the steering stability, and the shock burst resistance according to the following evaluation methods, and the test results are shown in Table 1.

High-Speed Durability

Each of the test tires was assembled on a wheel having a rim size of 20×9 1/2J, inflated to an internal pressure of 270 kPa, and mounted on a drum testing machine with a drum having a smooth steel surface and a diameter of 1707 mm. The ambient temperature was controlled to 38±3° C., the speed was increased from 120 km/h in increments of 10 km/h every 30 minutes, and the travel distance until failure occurred in the tire was measured. Evaluation results are expressed as measurement values with Conventional Example 1 being assigned the index value of 100. Larger index values indicate longer travel distance until failure occurs in the tire and better high-speed durability. Note that these index values of less than "110" mean that sufficient improvement effect was not achieved.

Steering Stability

Each of the test tires was assembled on a wheel having a rim size of 20×9 1/2J, inflated to an air pressure of 270 kPa, and mounted on a test vehicle (four wheel drive vehicle) having an engine displacement of 2000 cc. Sensory evaluations for the steering stability were performed on a test course including dry road surfaces by test drivers with two occupants riding in the vehicle. The evaluation results were rated by a 5-point method with the result of Conventional Example 1 assigned 3.0 (reference) and expressed as average points by five test drivers excluding the highest point and the lowest point. Larger evaluation values indicate superior steering stability. Note that these scores of "3.5" or greater mean that excellent steering stability was achieved.

Shock burst resistance

Each of the test tires was assembled on a wheel having a rim size of 20×9 1/2J and inflated to an air pressure of 270 kPa. Tire failure tests were performed by pressing a plunger having a plunger diameter of 19±1.6 mm against the central portion of the tread at a loading speed (plunger pressing speed) of 50.0±1.5 m/min, and tire strength (tire failure energy) was measured. Evaluation results are expressed by an index value with the measurement value of Conventional Example 1 as 100. Larger values indicate higher failure energy and superior shock burst resistance. Note that these index values of less than "110" mean that sufficient improvement effect was not achieved.

TABLE 1

|  |  |  | Conventional Example 1 | Comparative Example 1 | Comparative Example 2 |
|---|---|---|---|---|---|
| Carcass cord | Type of organic fiber |  | PET | PET | PET |
|  | Elongation at break | % | 17 | 17 | 20 |
|  | Elongation under load of 1.5 cN/dtex on inner circumferential side of belt layers | % | 5.0 | 5.0 | 5.4 |
|  | Thermal shrinkage rate | % | 1.7 | 1.7 | 1.6 |
|  | Twist coefficient K |  | 2200 | 2200 | 2200 |
| Cover cord | Type of organic fiber |  | Nylon | Aramid and nylon | Aramid and nylon |
|  | Tensile strength per width of 50 mm at 3.0% elongation | kN | 0.9 | 3.4 | 3.4 |
| High-speed durability |  | Index value | 100 | 125 | 120 |
| Steering stability |  |  | 3.0 | 2.5 | 3.3 |
| Shock burst resistance |  | Index value | 100 | 105 | 113 |

|  |  |  | Example 1 | Comparative Example 3 | Example 2 | Example 3 |
|---|---|---|---|---|---|---|
| Carcass cord | Type of organic fiber |  | PET | PET | PET | PET |
|  | Elongation at break | % | 23 | 19 | 20 | 23 |
|  | Elongation under load of 1.5 cN/dtex on inner circumferential side of belt layers | % | 5.5 | 7.0 | 7.0 | 8.5 |
|  | Thermal shrinkage rate | % | 1.6 | 1.2 | 1.2 | 0.9 |
|  | Twist coefficient K |  | 2200 | 2200 | 2200 | 2200 |
| Cover cord | Type of organic fiber |  | Aramid and nylon | Aramid and nylon | Aramid and nylon | Aramid and nylon |
|  | Tensile strength per width of 50 mm at 3.0% elongation | kN | 3.4 | 3.4 | 3.4 | 3.4 |
| High-speed durability |  | Index value | 119 | 115 | 115 | 110 |
| Steering stability |  |  | 3.5 | 4.0 | 4.0 | 4.4 |
| Shock burst resistance |  | Index value | 120 | 108 | 110 | 115 |

TABLE 2

|  |  |  | Comparative Example 4 | Example 4 | Comparative Example 5 |
|---|---|---|---|---|---|
| Carcass cord | Type of organic fiber |  | PET | PET | PET |
|  | Elongation at break | % | 27 | 23 | 23 |
|  | Elongation under load of 1.5 cN/dtex on inner circumferential side of belt layers | % | 8.6 | 7.0 | 7.0 |
|  | Thermal shrinkage rate | % | 0.9 | 1.2 | 1.2 |
|  | Twist coefficient K |  | 2200 | 2200 | 2200 |
| Cover cord | Type of organic fiber |  | Aramid and nylon | Aramid and nylon | Aramid and nylon |
|  | Tensile strength per width of 50 mm at 3.0% elongation | kN | 3.4 | 3.4 | 2.7 |
| High-speed durability |  | Index value | 108 | 115 | 108 |
| Steering stability |  |  | 4.5 | 4.0 | 4.5 |
| Shock burst resistance |  | Index value | 125 | 117 | 114 |

TABLE 2-continued

|  |  |  | Example 5 | Example 6 | Comparative Example 6 |
|---|---|---|---|---|---|
| Carcass cord | Type of organic fiber |  | PET | PET | PET |
|  | Elongation at break | % | 23 | 23 | 23 |
|  | Elongation under load of 1.5 cN/dtex on inner circumferential side of belt layers | % | 7.0 | 7.0 | 7.0 |
|  | Thermal shrinkage rate | % | 1.2 | 1.2 | 1.2 |
|  | Twist coefficient K |  | 2200 | 2200 | 2200 |
| Cover cord | Type of organic fiber |  | Aramid and nylon | Aramid and nylon | Aramid and nylon |
|  | Tensile strength per width of 50 mm at 3.0% elongation | kN | 2.8 | 4.0 | 4.1 |
| High-speed durability |  | Index value | 110 | 118 | 120 |
| Steering stability |  |  | 4.4 | 3.5 | 3.3 |
| Shock burst resistance |  | Index value | 115 | 119 | 120 |

As can be seen from Tables 1 and 2, in comparison to the Conventional Example 1, the tires of Examples 1 to 6 provided the high-speed durability and the steering stability in a highly compatible manner and also had improved shock burst resistance. On the other hand, in Comparative Example 1, the elongation at break of the carcass cord was small, the elongation under a load of 1.5 cN/dtex of the carcass cord on the inner circumferential side of the belt layers was also small, thus the steering stability, and the effect of improving the shock burst resistance was not sufficiently achieved. In Comparative Example 2, the elongation under a load of 1.5 cN/dtex of the carcass cord on the inner circumferential side of the belt layers was small, and thus the effect of improving the steering stability was not sufficiently achieved. In Comparative Example 3, the elongation at break of the carcass cord was small, and thus the effect of improving the shock burst resistance was not sufficiently achieved. In Comparative Example 4, the elongation under a load of 1.5 cN/dtex of the carcass cord on the inner circumferential side of belt layers was large, and thus the effect of improving the high-speed durability was not sufficiently achieved. In Comparative Example 5, the tensile strength of the cover cord per width of 50 mm at a 3.0% elongation was small, and thus the effect of improving the steering stability was not sufficiently achieved. In Comparative Example 6, the tensile strength of the cover cord per width of 50 mm at a 3.0% elongation was large, and thus the effect of improving the high-speed durability was not sufficiently achieved.

The invention claimed is:

1. A pneumatic tire, comprising:
   a tread portion extending in a tire circumferential direction and having an annular shape;
   a pair of sidewall portions respectively disposed on both sides of the tread portion;
   a pair of bead portions each disposed on an inner side of the sidewall portions in a tire radial direction;
   at least one carcass layer mounted between the pair of bead portions;
   a plurality of belt layers disposed on an outer circumferential side of the carcass layer in the tread portion; and
   a belt reinforcing layer disposed on an outer circumferential side of the belt layers;
   the carcass layer being formed of a carcass cord made of an organic fiber cord, an elongation at break of the carcass cord being 20% or more, an elongation under a load of 1.5 cN/dtex of the carcass cord on an inner circumferential side of the belt layers being from 6.2% to 8.5%,
   the belt reinforcing layer being formed of a cover cord made of an organic fiber cord, an angle of the cover cord with respect to the tire circumferential direction being set to from 0° to 5°, and a tensile strength of the cover cord per width of 50 mm at a 3.0% elongation being from 2.8 kN to 4.0 kN,
   the belt layer being formed of belt cords, an inclination angle of the belt cords with respect to the tire circumferential direction being set within a range of from 10° to 40°.

2. The pneumatic tire according to claim 1, wherein a twist coefficient K of the carcass cord represented by Formula (1) ranges from 2000 to 2500:

$$K = T \times D^{1/2} \quad (1)$$

where T is a cable twist count (times/10 cm) of the carcass cord and D is a total fineness (dtex) of the carcass cord.

3. The pneumatic tire according to claim 1, wherein the carcass cord includes a polyethylene terephthalate fiber.

4. The pneumatic tire according to claim 1, wherein the cover cord includes an aromatic polyamide fiber.

5. The pneumatic tire according to claim 1, wherein a thermal shrinkage rate of the carcass cord ranges from 0.5% to 2.5%.

6. The pneumatic tire according to claim 5, wherein a twist coefficient K of the carcass cord represented by Formula (1) ranges from 2000 to 2500:

$$K = T \times D^{1/2} \quad (1)$$

where T is a cable twist count (times/10 cm) of the carcass cord and D is a total fineness (dtex) of the carcass cord.

7. The pneumatic tire according to claim 6, wherein the carcass cord includes a polyethylene terephthalate fiber.

8. The pneumatic tire according to claim 7, wherein the cover cord includes an aromatic polyamide fiber.

* * * * *